(12) United States Patent
Jonas et al.

(10) Patent No.: US 9,739,606 B2
(45) Date of Patent: Aug. 22, 2017

(54) METHOD AND APPARATUS FOR INSPECTING WORKPIECES

(75) Inventors: Kevyn Barry Jonas, Clevedon (GB); Leo Christopher Somerville, St. Charles, IL (US)

(73) Assignee: RENISHAW PLC, Wotton-under-Edge (GB)

( * ) Notice: Subject to any disclaimer, the term of this patent is extended or adjusted under 35 U.S.C. 154(b) by 519 days.

(21) Appl. No.: 14/236,799

(22) PCT Filed: Aug. 9, 2012

(86) PCT No.: PCT/GB2012/000647
§ 371 (c)(1),
(2), (4) Date: Feb. 3, 2014

(87) PCT Pub. No.: WO2013/021157
PCT Pub. Date: Feb. 14, 2013

(65) Prior Publication Data
US 2014/0157861 A1 Jun. 12, 2014

Related U.S. Application Data

(60) Provisional application No. 61/550,669, filed on Oct. 24, 2011.

(30) Foreign Application Priority Data

Aug. 9, 2011 (GB) .................................. 1113715.5

(51) Int. Cl.
*G01B 21/02* (2006.01)
*G01B 21/04* (2006.01)
(Continued)

(52) U.S. Cl.
CPC .......... *G01B 21/042* (2013.01); *G01B 5/008* (2013.01); *G01B 5/0014* (2013.01); *G01B 21/045* (2013.01)

(58) Field of Classification Search
None
See application file for complete search history.

(56) References Cited

U.S. PATENT DOCUMENTS 4,819,195 A 4/1989 Bell et al.
4,949,469 A 8/1990 Wachtler
(Continued)

FOREIGN PATENT DOCUMENTS

CN 1221500 A 6/1999
CN 101421583 A 4/2009
(Continued)

OTHER PUBLICATIONS

British Examination Opinion and Cover Letter issued in British Patent Application No. GB1113715.5 on Nov. 21, 2011.
(Continued)

*Primary Examiner* — Robert R Raevis
(74) *Attorney, Agent, or Firm* — Oliff PLC

(57) ABSTRACT

A series of nominally identical production workpieces is measured on a measuring apparatus. To correct for temperature variations, one of the workpieces forms a master artifact, the dimensions of which are known. The artifact is measured on the measuring apparatus at two or more temperatures, producing two or more corresponding sets of measured dimensional values of the master artifact at the respective temperatures. One or more error maps, look-up tables, or functions are generated which relate the measured dimensional values of the artifact to the known dimensions of the artifact. The error map(s), look-up table(s) or function(s) are dependent on the respective temperatures at which the artifact was measured. Correction values derived from the error map(s), look-up table(s) or function(s) are used to correct the measurements of production workpieces in the series. These correction values are determined in
(Continued)

dependence upon the temperature at which the workpiece measurements were obtained.

25 Claims, 4 Drawing Sheets

(51) Int. Cl.
  *G01B 5/00* (2006.01)
  *G01B 5/008* (2006.01)

(56) References Cited

U.S. PATENT DOCUMENTS

| | | | |
|---|---|---|---|
| 5,011,297 | A | 4/1991 | Tittl |
| 5,195,826 | A * | 3/1993 | Enderle et al. ............... 374/142 |
| 5,257,460 | A | 11/1993 | McMurtry |
| 5,426,861 | A | 6/1995 | Shelton |
| 5,446,545 | A * | 8/1995 | Taylor ........................ 356/501 |
| 5,594,668 | A | 1/1997 | Bernhardt et al. |
| 5,895,442 | A | 4/1999 | Arndt |
| 6,336,375 | B1 | 1/2002 | McMurtry et al. |
| 6,434,846 | B1 | 8/2002 | McMurtry et al. |
| 7,079,969 | B2 | 7/2006 | Taylor et al. |
| 7,131,207 | B2 | 11/2006 | McFarland |
| 7,376,261 | B2 * | 5/2008 | Noda et al. ................... 382/152 |
| 7,587,840 | B2 | 9/2009 | Sakai et al. |
| 8,115,808 | B2 * | 2/2012 | Fricke et al. .................. 348/95 |
| 8,138,769 | B2 | 3/2012 | Cristini |
| 2005/0000105 | A1 | 1/2005 | Schepperle et al. |
| 2009/0090013 | A1 | 4/2009 | Hicks |
| 2010/0169721 | A1 | 7/2010 | Chang et al. |
| 2010/0299094 | A1 | 11/2010 | Hsu |
| 2010/0319207 | A1 | 12/2010 | Held |
| 2011/0040514 | A1 | 2/2011 | Kunzmann et al. |

FOREIGN PATENT DOCUMENTS

| | | |
|---|---|---|
| CN | 101918792 A | 12/2010 |
| DE | 43 38 351 CI | 1/1995 |
| DE | 4436782 A1 | 4/1995 |
| EP | 0546784 A2 | 6/1993 |
| EP | 1128 156 A1 | 8/2001 |
| EP | 1 748 278 A1 | 1/2007 |
| JP | A-57-125812 | 8/1982 |
| JP | H-05-272903 A | 10/1993 |
| JP | A-06-190687 | 7/1994 |
| JP | A-06-229705 | 8/1994 |
| JP | 2000-511827 A | 9/2000 |
| JP | 2004-028653 A | 1/2004 |
| JP | 2004-138449 A | 5/2004 |
| JP | 2005-265700 A | 9/2005 |
| JP | 2008-249352 A | 10/2008 |
| JP | 2011-021962 A | 2/2011 |
| WO | 88/09915 A1 | 12/1988 |
| WO | 97/46925 A1 | 12/1997 |
| WO | WO 00/34974 A1 | 6/2000 |
| WO | 00/62015 A1 | 10/2000 |
| WO | WO 03/006837 A1 | 1/2003 |
| WO | 03/074968 A1 | 9/2003 |
| WO | 2004/005849 A1 | 1/2004 |
| WO | WO 2004/063579 A1 | 7/2004 |
| WO | WO 2005/071350 A1 | 8/2005 |
| WO | 2007/122362 A1 | 11/2007 |
| WO | 2009/013769 A1 | 1/2009 |
| WO | 2011/107729 A1 | 9/2011 |

OTHER PUBLICATIONS

Sep. 14, 2015 Office Action issued in Chinese Patent Application No. 201280044062.1.
Machine Translation of Japanese Laid-open Patent Publication JP-A-H06-229705.
Mar. 9, 2016 Examination Report issued in European Patent Application No. 12751351.3.
Search Report issued in British Application No. 1113715.5 dated Nov. 18, 2011.
International Search Report issued in International Application No. PCT/GB2012/000647 dated Dec. 21, 2012.
Written Opinion of the International Searching Authority issued in International Application No. PCT/GB2012/000647 dated Dec. 21, 2012.
May 17, 2016 Office Action issued in connection with Japanese Patent Application No. 2014-524437.
Apr. 25, 2017 Office Action issued in Japanese Application No. 2014-524437.

* cited by examiner

METHOD AND APPARATUS FOR INSPECTING WORKPIECES

FIELD OF THE INVENTION

This invention relates to measuring apparatus for inspecting the dimensions of workpieces, and more particularly to coordinate measuring apparatus. Coordinate measuring apparatus include, for example, coordinate measuring machines (CMM), machine tools, manual coordinate measuring arms and inspection robots.

DESCRIPTION OF PRIOR ART

It is common practice after workpieces have been produced, to inspect them on a coordinate measuring machine (CMM) having a movable member supporting a probe, which can be driven within a three-dimensional working volume of the machine.

The CMM (or other coordinate measuring apparatus) may be a so-called Cartesian machine, in which the movable member supporting the probe is mounted via three serially-connected carriages which are respectively movable in three orthogonal directions X,Y,Z. Alternatively, it may be a non-Cartesian machine, for example comprising three or six extensible struts which are each connected in parallel between the movable member and a relatively fixed base member or frame. The movement of the movable member (and thus the probe) in the X,Y,Z working volume is then controlled by coordinating the respective extensions of the three or six struts. An example of a non-Cartesian machine is shown in International Patent Applications WO 03/006837 and WO 2004/063579.

Thermal expansion and contraction affects the measurement of workpieces. To measure a workpiece accurately in a changing thermal environment, it is known from U.S. Pat. No. 5,257,460 (McMurtry) and U.S. Pat. No. 5,426,861 (Shelton) to take measurements of a reference workpiece or master artefact, having features of a similar size and shape to the workpiece. These are then compared with the measurements of the production workpiece under inspection, in the same thermal environment. For example, if the master artefact/reference workpiece is a known, good workpiece in a series of nominally identical workpieces, then it may act as a datum against which all the other workpieces are compared. If absolute measurement is required, then the master artefact/reference workpiece may be calibrated on a more accurate measuring machine.

A problem arises with the above technique if the thermal environment changes during the course of measurements on a series of nominally identical workpieces. To maintain accuracy, it is necessary to remaster (i.e. to remeasure the master artefact), to provide a new datum for subsequent comparative measurements. This takes time. Furthermore, in a changing environment the frequency with which such re-mastering is needed is variable, and may be unknown or difficult to establish.

SUMMARY OF THE INVENTION

One aspect of the present invention provides a method of measurement on measuring apparatus, comprising:
providing a master artefact having known dimensions,
measuring the master artefact on said apparatus at two or more temperatures, and producing two or more corresponding sets of measured dimensional values of the master artefact at the respective temperatures,
measuring said temperatures at which the master artefact was measured,
generating one or more error maps or look-up tables or functions which relate the measured dimensional values of the master artefact to the known dimensions of the master artefact, the or each error map, look-up table or function being dependent on said respective temperatures at which the master artefact was measured.

Said one or more error maps or look-up tables or functions may then be stored with the measured values of the respective temperatures.

A second aspect of the present invention provides a method of measurement on measuring apparatus, comprising:
providing a master artefact having known dimensions,
measuring the master artefact on said apparatus at a first temperature, and producing a resulting first set of measured dimensional values of the master artefact at the first temperature,
measuring the master artefact on said apparatus at at least a second temperature, and producing at least a second set of measured dimensional values of the master artefact at the respective temperature or temperatures, and
generating one or more error maps or look-up tables or functions which relate the measured dimensional values of the master artefact at at least the first and second temperatures to the temperatures at which the dimensional values were measured, and to the known dimensions of the master artefact.

In either if the above aspects, one error map or lookup table or function may relate the measured dimensional values of the master artefact to the known dimensions of the master artefact at a plurality of the respective temperatures. Alternatively, respective error maps or lookup tables or functions may relate the measured dimensional values of the master artefact to the known dimensions of the master artefact at respective said temperatures.

The master artefact may have features which have similar dimensions to features of a workpiece to be measured. For example, it may have features with a similar shape, size or location. It may be a workpiece forming one of a series of nominally identical workpieces to be measured.

The generated error map(s) or look-up table(s) or function(s) may be used to correct subsequent measurements of production workpieces. Such a method main include measuring a production workpiece on said apparatus to obtain measured workpiece dimensional values; and measuring the temperature at which the measured workpiece dimensional values were obtained. The measured workpiece dimensional values may then be corrected with correction values derived from a said error map or look-up table or function, determined in dependence upon the temperature at which the workpiece dimensional values were obtained.

A third aspect of the present invention provides a method of measuring a workpiece on measuring apparatus, comprising:
providing a master artefact in the form of a reference workpiece having known dimensions,
measuring the reference workpiece on said apparatus at a first temperature, and producing a resulting first set of measured dimensional values of the reference workpiece at the first temperature,
generating at least one error map or look-up table or function which relates the measured dimensional values of the reference workpiece at the first temperature to the known dimensions of the reference workpiece, measuring a production workpiece on said apparatus to obtain measured workpiece dimensional values, and measuring the temperature at which the workpiece dimensional values were obtained, and correcting the workpiece dimensional values with correction values derived from the error map, look-up table or function, wherein the correction values are determined in dependence upon the temperature at which the workpiece dimensional values were obtained.

In one advantageous form, the above method may further comprise:

measuring the reference workpiece at at least one further temperature, and producing at least one further set of measured dimensional values of the reference workpiece at the respective temperature or temperatures, wherein said error map or look-up table or function also relates the measured dimensional values of the reference workpiece at the further temperature or temperatures to the known dimensions of the reference workpiece.

In an alternative advantageous form, the method may further comprise:

measuring the reference workpiece at at least one further temperature, and producing at least one further set of measured dimensional values of the reference workpiece at the respective temperature or temperatures, generating at least one further error map or look-up table or function which relates the measured dimensional values of the reference workpiece at the further temperature or temperatures to the known dimensions of the reference workpiece, and correcting the workpiece dimensional values with correction values derived from the at least one further error map, look-up table or function, in dependence upon the temperature at which the workpiece dimensional values were obtained.

Thus, in these alternatives, there may be one combined map, lookup table or function providing correction values corresponding to multiple temperatures, or there may be separate error maps, lookup tables or functions for different temperatures.

In any of the above aspects of the invention, the method may include checking whether the temperature at which a production workpiece is measured or is to be measured corresponds to the temperature of one of said error maps or lookup tables or functions, to within a predetermined tolerance, and if so then correcting the workpiece dimensional values with correction values derived from the corresponding error map or lookup table or function.

In any of the above aspects of the invention, the method may include checking whether the temperature at which a production workpiece is measured or is to be measured corresponds to the temperature of an error map or lookup table or function, to within a predetermined tolerance, and if not then remeasuring the master artefact and producing a further set of measured dimensional values of the master artefact at the respective temperature.

Alternatively, if there is a difference between the temperature at which the workpiece measurement values were obtained and the temperature of an error map or lookup table or function, then correction values may be determined from the error map(s) or look-up table(s), e.g. by interpolation or extrapolation. For example, this may be done by fitting a function which relates measurement values obtained at different temperatures; or by a calculation using the temperature difference and the coefficient of thermal expansion of the material of the workpiece. Alternatively, if the temperature difference is greater than a desired tolerance, then the workpiece measurement values may be rejected.

In any of the above aspects of the invention, the master artefact may have features, the dimensions of which (e.g. their shape, size and/or location) correspond to features of the production workpiece to be measured. Or the master artefact may be one of a series of nominally identical production workpieces. Where a production workpiece is mentioned, it may be one of a series of nominally identical workpieces.

The known master artefact dimensions may be obtained from a source external to the measuring apparatus. This may be by calibrating the master artefact. The master artefact may be calibrated on a more accurate measuring system, possibly in a separate temperature controlled environment. This may be certified as an absolute measuring system. Alternatively, in the case of a reference workpiece, its dimensions may be obtained from design data for the reference workpiece.

The measuring apparatus may be a coordinate measuring apparatus, such as a coordinate measuring machine.

The measured dimensional values of the reference or production workpiece may simply be coordinate measurements of individual points on the surface of the workpiece. Alternatively, the measured dimensional values may be measured dimensions of features of the reference or production workpiece. They may be derived from such coordinate measurements of points.

Further aspects of the invention provide a measuring apparatus configured to perform the above method, and software which is configured to cause a measuring apparatus to perform the method.

BRIEF DESCRIPTION OF THE DRAWINGS

Preferred embodiments of the invention will now be described, by way of example, with reference to the accompanying drawings, wherein.

DESCRIPTION OF PREFERRED EMBODIMENTS

Figure 1:
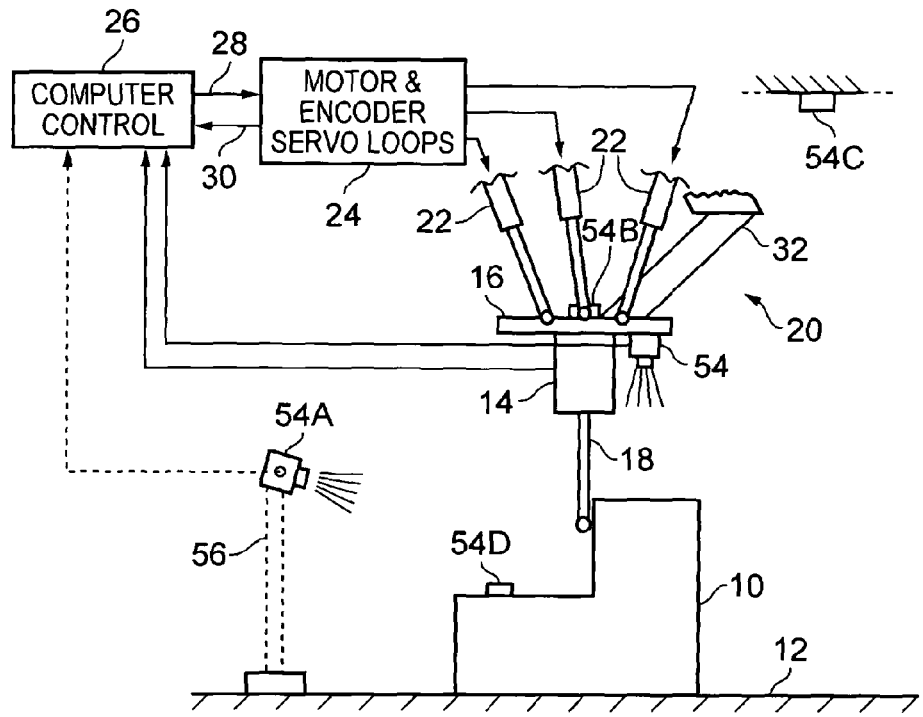
FIG. 1 is a diagrammatic representation of a non-Cartesian coordinate measuring apparatus or machine (CMM)

In the coordinate measuring machine shown in FIG. 1, a workpiece 10 which is to be measured is placed on a table 12 (which forms part of the fixed structure of the machine). A probe having a body 14 is mounted to a movable platform member 16. The probe has a displaceable elongate stylus 18, which in use is brought into contact with the workpiece 10 in order to make dimensional measurements.

The movable platform member 16 is mounted to the fixed structure of the machine by a supporting mechanism 20, only part of which is shown. In the present example, the supporting mechanism 20 is as described in International Patent Applications WO 03/006837 and WO 2004/063579.

It comprises three telescopic extensible struts 22, extending in parallel between the platform 16 and the fixed structure of the machine. Each end of each strut 22 is universally pivotably connected to the platform 16 or to the fixed structure respectively, and is extended and retracted by a respective motor. The amount of the extension is measured by a respective encoder. The motor and encoder for each strut 22 form part of a servo loop controlling the extension and retraction of the strut. In FIG. 1, the three motors and encoders in their three respective servo loops are indicated generally by reference numeral 24.

The supporting mechanism 20 also comprises three passive anti-rotation devices 32 (only one of which is shown in FIG. 1). The anti-rotation devices extend in parallel between the platform 16 and the fixed structure of the machine. Each anti-rotation device constrains the platform 16 against one rotational degree of freedom. As a result, the platform 16 is movable with only three translational degrees of freedom, but cannot tilt or rotate. See U.S. Pat. No. 6,336,375 for further discussion of such anti-rotation devices.

Figure 2:
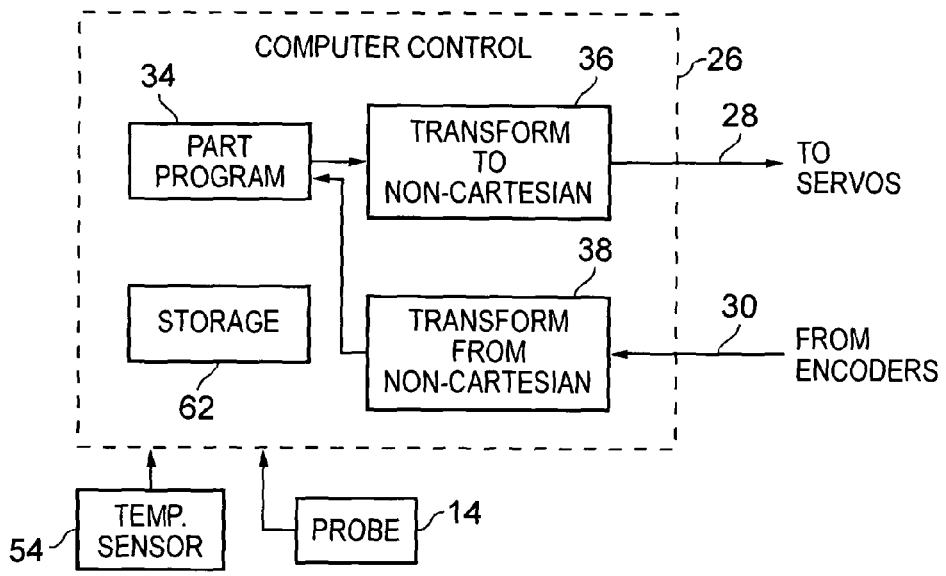
FIG. 2 shows diagrammatically a part of a computer control system of the machine.

Referring to FIG. 1 with FIG. 2, a computer control 26 positions the movable platform 16, under the control of a part program 34 which has been written for the measurement of the workpiece 10. To achieve this, the control 26 coordinates the respective extensions of the three struts 22. A program routine 36 transforms commands in X,Y,Z Cartesian coordinates from the part program to corresponding non-Cartesian lengths required of the struts. It produces demand signals 28 to each of the servo loops 24, as a result of which the three struts 22 extend or retract to position the platform 16 accordingly. Each servo loop acts in a known manner to drive the respective motor so as to cause the encoder output to follow the demand signal 28, tending to equalise them.

The control 26 also receives measurement signals 30 from the encoders which form part of the servo loops. These indicate the instantaneous non-Cartesian lengths of each of the struts 22. They are transformed back into Cartesian X,Y,Z coordinates by a program routine 38, for use by the part program 34.

The probe 14 may be a touch trigger probe, which issues a trigger signal to the computer control 26 when the stylus 18 contacts the workpiece 10. Alternatively, it may be a so-called measuring or analogue probe, providing analogue or digital outputs to the control 26, which measure the displacement of the stylus 18 relative to the body 14 of the probe in three orthogonal directions X, Y, Z. Instead of such contact probes, it may be a non-contact probe such as an optical probe.

In use, the platform 16 is moved to position the probe 14 relative to the workpiece 10, under the control of the part program, either in a point-to-point measurement pattern, or scanning the surface of the workpiece. For touch trigger measurements, when it receives the touch trigger signal the computer control 26 takes instantaneous readings of the non-Cartesian measurement signals 30 from the encoders of the struts 22, and the transform routine 38 processes these to determine an X,Y,Z Cartesian coordinate position of the point contacted on the workpiece surface. In the case of a measuring or analogue probe, the control combines the instantaneous outputs of the probe with the instantaneous values transformed into Cartesian coordinates from the measurement signals 30 of the struts. In the case of scanning, this is done at a large number of points to determine the form of the workpiece surface. If required, feedback from a measuring or analogue probe may be used to alter the demand signals 28, so that the machine moves the probe in order to keep it within a desired measuring range of the workpiece surface.

Figure 3:
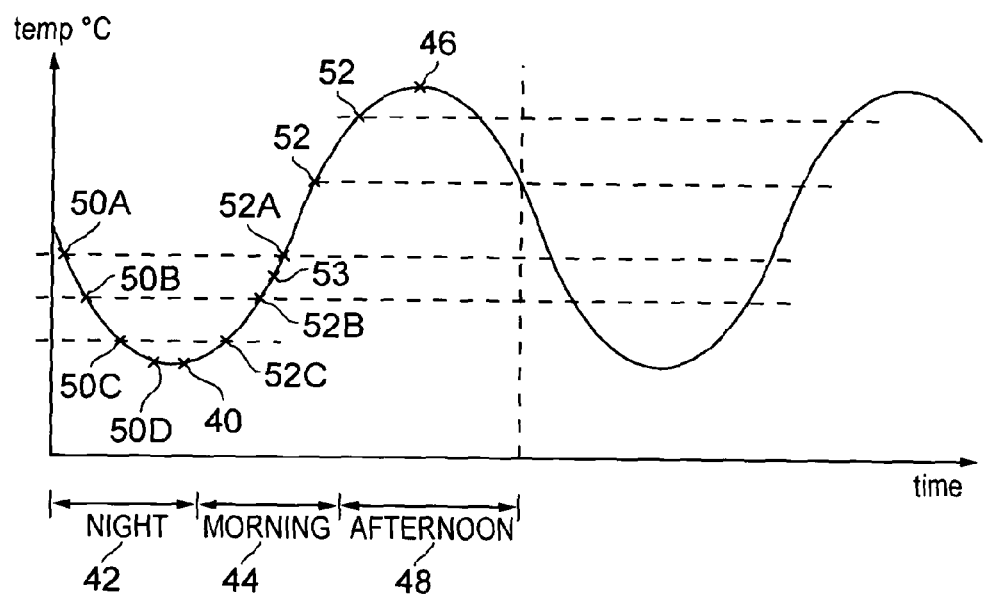
FIG. 3 is a graph showing the change in environmental temperature in a typical factory over a period of one or more working days.

FIG. 3 is a graph showing the change in environmental temperature in a typical factory over a period of one or more working days. It illustrates how the environmental temperature changes from one working shift to the next. For example, the temperature drops to its lowest point at 40 during the course of a night shift 42. It rises again during the course of a morning shift 44, to a maximum temperature at 46 during an afternoon/evening shift 48. A similar cycle is repeated on subsequent days.

Of course, workpieces to be measured and the machines which measure them are subject to these temperature fluctuations, and measurements will be inaccurate unless corrected. In the above-noted prior art methods which make comparative measurements against an artefact, in order to achieve accuracy it has been necessary to remaster (i.e. to remeasure the artefact) at a plurality of time points during the day, whenever the temperature has changed, such as the points indicated at 50A-D, 52, 52A-C in FIG. 3.

The embodiment of the invention shown in FIG. 1 includes an infra-red temperature sensor 54, which may conveniently be mounted on the movable platform member 16 in order to address the workpiece 10 being measured and measure its temperature. Alternatively, an infra-red sensor 54A may be mounted to the fixed structure of the CMM, e.g. on an optional bracket or stand 56, in order to measure the workpiece temperature. Such an infra-red sensor may simply take an average reading of the temperature of an area of the workpiece surface, or it may be a thermal imaging sensor arranged to recognise and take the temperature of a specific workpiece feature.

In another alternative, if the CMM has facilities for automatically exchanging the probe 14, then it may be exchanged for a contact temperature sensor (not shown) which is brought into contact with the surface of the workpiece 10 and dwells there for a period in order to measure its temperature. Such an exchangeable contact temperature sensor is described in U.S. Pat. No. 5,011,297. Or a temperature sensor (such as a thermocouple) may be placed manually on the surface of the workpiece, as shown at 54D.

In a further alternative, a simple environmental temperature sensor of any suitable type (e.g. a thermocouple) may be provided in order to take the environmental temperature rather than specifically measuring the temperature of the workpiece. FIG. 1 shows such an alternative temperature sensor 54B, mounted to the platform 16 or to the probe 14. In this position it can measure the environmental temperature in the vicinity of the workpiece 10, without undue influence from heat generated by the motors. Another option is an environmental temperature sensor 54C, mounted to the fixed structure of the machine, or separately from it, so as to take the background environmental temperature.

It is possible to use two or more temperature sensors, for example one close to the workpiece such as the sensor 54 or 54B or 54D, plus another such as 54C which takes the background environmental temperature. The control 26 may then be programmed to use a weighted average of the readings from the two or more temperature sensors, e.g. 90% from the background sensor and 10% from the sensor close to the workpiece. The relative weightings may be adjusted by trial and error to obtain good results.

Figure 4:
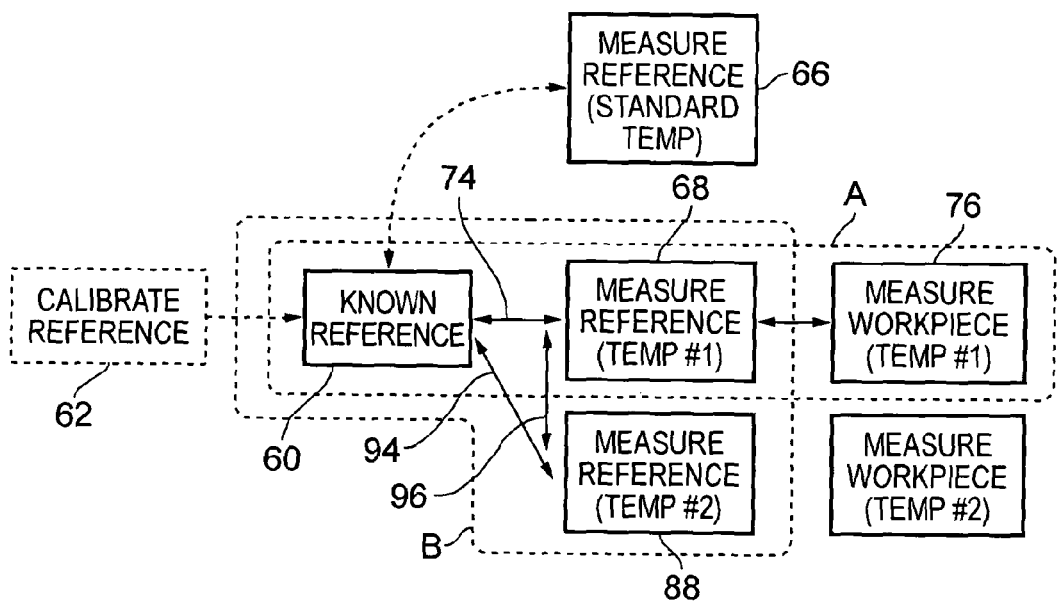
FIG. 4 is a schematic diagram illustrating processes which take place in the preferred embodiments.
Figure 5:
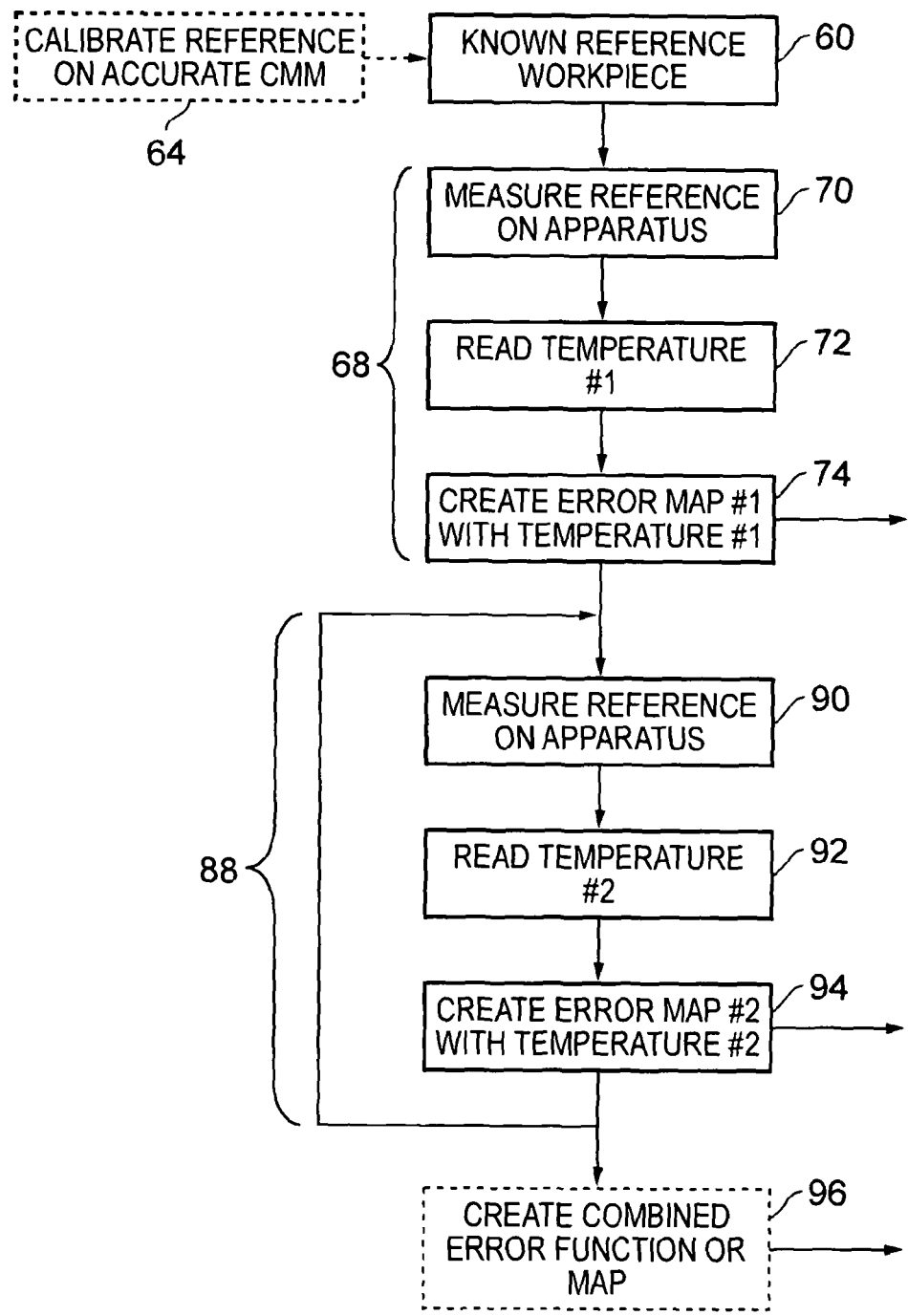
FIGS. 5 and 6 are flowcharts of software programs which cause the CMM to perform preferred methods according to the invention when run on the computer control system.
Figure 6:
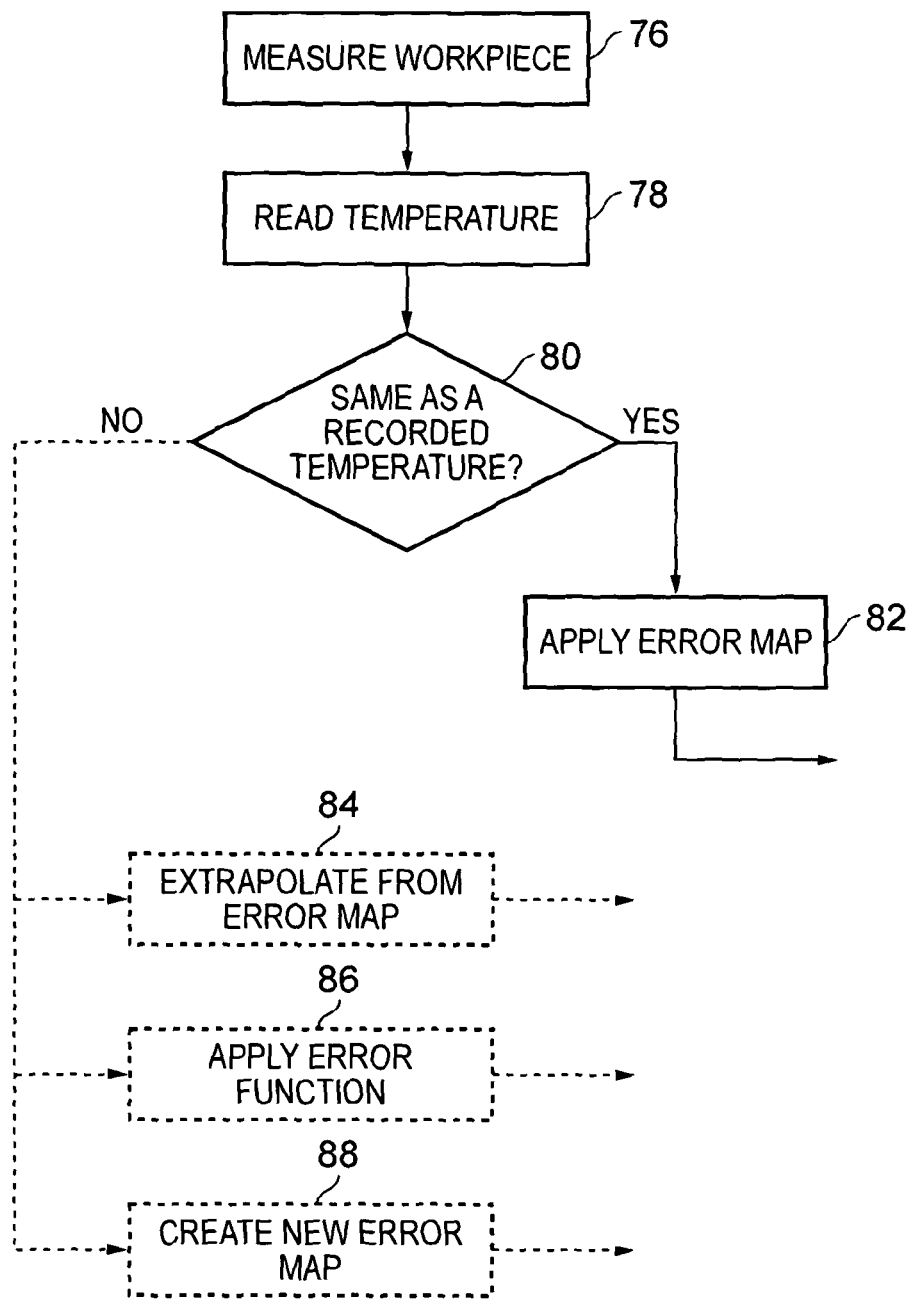

In use, the apparatus described may be used to inspect a series of production workpieces 10 which are nominally or substantially identical, e.g. as they come off a production line, or as they are manufactured on a machine tool. To do this, the computer control 26 may operate programs as shown in FIGS. 4 to 6. Some steps of these processes may be performed manually, or include manual intervention. For example, where it is required to place an article on the table 12 of the CMM, this may be done manually or by a robot.

At the start of this method (step 60 in FIGS. 4 and 5), a master artefact—a reference workpiece—is placed on the table 12 of the CMM. The master artefact/reference workpiece may be a first workpiece in the series of nominally or substantially identical production workpieces, thereby having features with similar dimensions to subsequent workpieces to be measured. Or it may be a specially-produced artefact which has one or a number of features which have similar dimensions to features of workpieces in the series of production workpieces. (References herein to a reference workpiece apply equally to such a specially-produced artefact, and vice versa.)

For example, the features may have similar shapes, and/or their sizes and/or locations may correspond. And/or the dimensional relationships between features may correspond. For example the master artefact/reference workpiece may have features such as bores which are spaced apart by a similar distance as corresponding features of the production workpiece. Or it may have parallel surfaces which correspond to parallel surfaces of the production workpiece. It is not necessary that the master artefact or reference workpiece is manufactured perfectly; its dimensions may depart from the nominal design values.

Suitably the dimensions of the master artefact/reference workpiece are calibrated, so that they are known (step 62, FIG. 4). In a preferred embodiment they are known from a source external to the measuring apparatus of FIG. 1. This may be done by measuring the dimensions of the master artefact/reference workpiece on a separate measuring apparatus, such as a more accurate coordinate measuring machine (step 64, FIG. 5). This machine may itself have been calibrated and certified to traceable standards as an absolute measuring system, and it may be used in a temperature controlled environment.

Alternatively, if the coordinate measuring apparatus of FIG. 1 has itself been calibrated, then the artefact dimensions may be measured on that, at a standard temperature such as 25° C.—step 66, FIG. 4. (Although this may not be possible if, as suggested below, the coordinate measuring apparatus of FIG. 1 has not been calibrated.)

A further possibility is that the dimensions of the artefact may be known from an external source simply by obtaining them from design data of the artefact, e.g. a drawing or a CAD file. This assumes that the artefact has been accurately manufactured to the design data, and so is especially suitable if the artefact is not one of the series of workpieces to be measured.

In a step 68 (FIG. 4), the dimensions of the known master artefact/reference workpiece are measured, at a first temperature. Depending on the time of day, this first temperature may be any of the temperatures noted in FIG. 3, e.g. the temperature 50A. As shown in FIG. 5, the step 68 of measuring the reference workpiece includes (in either order) the steps 70 and 72.

In the step 70, dimensional measurements are made of the master artefact or reference workpiece by moving the probe 14 in relation to it, under the command of a part program 34, to take a coordinate measurement at each desired point on the surface of the workpiece. The coordinate measurement of each individual point may itself be considered as a measured dimensional value. Alternatively, from these coordinate measurements, there may be derived measured dimensional values of features, such as the diameter of a circular feature, the width of a slot, the thickness of a flange, etc. Or the derived measured dimensional values may be relationships between features. For example they may be the spacing of features such as bores, or they may denote the parallelism of surfaces which are nominally parallel to each other. In any of these cases, these measured dimensional values are stored as comparison values in a storage medium 62 of the control 26.

In step 72, the first temperature reading of the master artefact or reference workpiece is taken by the temperature sensor 54 (or one or more of the other types of sensor mentioned such as 54A, 54B or 54C). The corresponding first temperature value is stored with the dimensional measurement values.

A first error map or look-up table or error function is now calculated, in step 74. This compares and relates the measured dimensions of the reference workpiece to its known dimensions, at the first temperature. The first error map or look-up table or function is also stored, together with the corresponding first temperature value, in the storage medium 62 of the control 26. They may be stored in a file or folder on a hard disc of the storage medium, or in volatile or non-volatile memory. In a first mode of realisation of the invention, enclosed in the outline A in FIG. 4 and also shown in FIG. 6, the method proceeds as follows. The master artefact/reference workpiece is replaced by the series of production workpieces 10, each of which is placed in turn on the table 12. For each workpiece, in step 76, dimensional measurements are made under the control of a part program 34. This produces measured dimensional values of the same types as discussed above for the master artefact or reference workpiece. Before or after this, in step 78, a temperature reading is taken from the sensor 54 (or 54A, 54B, 54C). In step 80, the program determines whether the temperature read in step 78 is equal (or sufficiently close, within a predetermined tolerance) to the temperature recorded with the error map or look-up table or function in step 68. If the answer is "yes", then that error map or look-up table or function is applied in step 82, in order to correct the measurements. The results are stored in the storage medium 62.

The workpiece is then replaced, and the steps 76, 78, 80 and 82 are repeated for each production workpiece in the series. This continues until such time as the step 80 results in the answer "no"—in other words until the temperature has changed to such an extent that it is no longer sufficiently close to the temperature at which the error map, table or function was recorded.

It is not necessary for the temperature to be checked (step 78) for every single workpiece that is measured (step 76). It will often be adequate merely to check at periodic intervals whether the temperature is still sufficiently close to the temperature at which the error map, table or function was recorded. For example, this may be checked at regular time intervals, or after a predetermined number of workpieces have been measured. Alternatively, the temperature may be monitored before or after each workpiece is measured, to check whether the temperature has changed by more than a predetermined amount. If the temperature has not changed, or is within the predetermined tolerance of the previous value, then steps 76, 80 and 82 are repeated on the next workpiece in the series.

As shown in FIG. 3, it is to be expected that the temperature will change over a daily cycle. If it is determined in step 80 that the temperature has changed by more than the predetermined tolerance (i.e. the answer is "no"), then it is possible just to stop the measurement process, and alert an operator, e.g. by an alarm signal. However, there are several alternative options.

In one option (step 88), the master artefact/reference workpiece may be reloaded onto the table 12 and remastered (by remeasuring it). The system may alert an operator to do this, e.g. with an alarm signal. This step 88 creates a new error map, look-up table or function at the new temperature, and is further shown in FIGS. 4 and 5. Essentially, the steps 70, 72 and 74 are repeated in steps 90, 92 and 94. The results of these measurements are again stored in the storage medium 62, together with the corresponding changed temperature value as measured in step 92. Of course, rather than a separate temperature reading in step 92, the most recent temperature value taken in step 78 may be used instead. Furthermore, as discussed below, the results of step 88 may be incorporated into a single, combined super-set error map or table, rather than creating a separate new error map or table.

The outline B in FIG. 4 illustrates that this creation of an error map or lookup table or function at two or more different temperatures (steps 68 and 88) forms another preferred embodiment of the invention.

Further workpieces in the series are now measured and corrected, as described above (steps 76, 78, 80, 82), but using the new error map, table or function from the remastered measurements of the master artefact/reference workpiece. Thus, the corrections of the measurements of these further workpieces in the series take account of the changed temperature.

Considering FIG. 3, it will be appreciated that this remastering (remeasuring the reference workpiece) takes place at different points 50A-D, 52, 52A-C in the daily cycle, at different environmental temperatures during the working shift pattern. It may be repeated as many times as necessary during the daily cycle, as indicated by the loop shown at 88 in FIG. 5. As a result, over time, the computer control 26 builds up many different error maps, tables or functions, covering the whole range of temperatures experienced over a working day. Or it builds a growing, combined super-set error map, table or function as discussed below. In essence, the computer "learns" the corrections necessary at different temperatures.

Therefore, after it has been determined in step 80 that the temperature has changed, and before proceeding to the remastering step 88 with the master artefact/reference workpiece, the step 80 first checks whether it is possible to reuse existing correction values or measurements of the master artefact/reference workpiece which have already been stored in the storage medium 62, rather than remastering. Existing values may be used directly, or by extrapolation or interpolation.

In a simple embodiment, the new temperature value determined in step 78 may be compared with temperature values which have previously been stored, together with error maps or look-up tables, to see if a match can be found, to within a desired tolerance. If yes, then step 82 may reuse the measurements or correction values from the corresponding error map or table in the storage medium 62, instead of remastering. The program of FIG. 6 continues to measure and compare workpieces in the series (step 76), but using the previously-stored correction or comparison values retrieved from the storage medium 62. Thus, there is no need for the time-consuming steps of replacing the master artefact on the table 12 and remeasuring it. This is a considerable time saving, not only later in the same day, but also on future days, when (as seen in the right-hand part of FIG. 3) no remastering at all may be required.

On the other hand, if it is found in step 80 that there is no corresponding set of existing data corresponding sufficiently closely to the current temperature, or if the existing data is inadequate for interpolation or extrapolation (see below), then the remastering step 88 proceeds as above.

As described above, a separate error map of lookup table is created and stored for each temperature. However, as shown in step 96 in FIGS. 4 and 5, it is possible to amalgamate all the data in a single map or lookup table or function, with the respective temperature values. For example, each new error map or table or function may relate the measurements to one or more previous tables, rather than directly back to the known dimensions of the master artefact/reference workpiece. Thus, these subsequent error maps or tables or functions are related back to the reference workpiece only indirectly. All such error maps or tables or functions may be combined into a single error map or table, forming a super-set of the error maps or tables corresponding to the different temperatures. This super-set will grow over time, as data for different temperatures is added to it.

It is not essential that the temperature sensor should be capable of measuring the temperature with absolute accuracy. Since the method described compares the measured temperature with previously stored temperature measurements, it is more important that the temperature measurements should be repeatable rather than absolutely accurate.

The above simple embodiment of the method is useful where points 52A-C in one part of the daily cycle or working shift pattern shown in FIG. 3 have the same temperature as corresponding points 50A-C in a previous part of the cycle. Whenever measurements have previously been made at a corresponding temperature (within the desired tolerance), the existing comparison or correction values previously stored in the storage medium 62 may be reused, instead of remastering. To facilitate this, step 78 may be programmed to check for specific predetermined temperatures, for example separated by a predetermined temperature change such as 5° C.

Instead of the remastering step 88, another option is to derive appropriate correction values from the existing error map or look-up table by extrapolation (optional step 84). For example, if it is assumed that the material of the workpieces has a linear coefficient of thermal expansion, the existing values in the table may be simply be multiplied by a multiplier based on that coefficient, or based on practical experience with similar workpieces.

Alternatively, in a more sophisticated embodiment, if it is found in step 78 that the current temperature lies between two or more previously stored temperature values, then the required comparison or correction values may be produced by interpolation between the corresponding values in the corresponding stored maps or tables. For example, in FIG. 3, the point 53 occurs at a temperature between two previously stored points 50A, 50B. In this situation, the required comparison or correction values may be determined by a linear interpolation between corresponding values in two adjacent sets of measurement data taken at points 50A, 50B. For more accurate results, where four or more previously-stored sets of data exist, corresponding to temperature values 50A-50D which straddle the temperature at the point 53, then a quadratic interpolation may be performed in step 70. Of course, the interpolation takes account of the actual measured temperature at the point 53, compared to the stored temperature values of the stored data sets at 50A-D. It may also take account of the direction in which the temperature is changing (increasing or decreasing) and possibly also of its rate of change.

In place of a linear or quadratic function, other polynomial or non-polynomial functions may be used for the interpolation, e.g. cubic or quadratic spline or logarithmic functions, fitting the function to corresponding comparison or correction values taken at several different temperatures.

In a further alternative option, rather than producing a new set of comparison or correction values to correct a specific measurement, the interpolation may be used in step 96 to establish error or correction functions or coefficients, namely formulas or coefficients. These are then applied in step 86 to each measurement in order to correct it. Such error or correction functions or coefficients may be determined when the master artefact is measured or remeasured (step 88) and stored in the storage medium 62, along with the associated temperature value, instead of storing a look-up table or map of comparison measurement values or correction values. In one embodiment of this, the correction functions or coefficients are fed in to the routine 38 which transforms the non-Cartesian measurement values from the encoders into Cartesian measurement values. Alternatively, the correction functions or coefficients may be applied to workpiece measurements by the part program 34.

It will be appreciated that the preferred methods described involve comparative measurements against an artefact of known dimensions. This means that it is not necessary for the coordinate measuring apparatus of FIG. 1 to have been calibrated itself, since accurate results can be obtained merely by relying on the repeatability of the apparatus (the reproducibility of its measurements). In these circumstances, the apparatus is acting as a comparative gauge, and in order to give absolute accuracy it need not be calibrated or certified as an absolute measuring system. However, it may be so certified if desired.

Of course, it will be appreciated that numerous modifications may be made to the above embodiments, for example as follows.

Other supporting mechanisms for moving the probe 14 can be used, rather than the supporting mechanism 20 with three extensible struts as shown in FIG. 1. For example, it is possible to use a hexapod supporting mechanism, with six extensible struts pivotably mounted in parallel between the movable member 16 and the fixed structure of the machine. Each such strut is extended and retracted by a motor and encoder forming a servo loop, as above. The extension and retraction of each strut is coordinated by the computer control, to control the movement of the movable member in five or six degrees of freedom (so the probe 14 can be orientated by tilting about X and Y axes, as well as translated in the X,Y and Z directions). The outputs of the encoders are read by the computer control and transformed into Cartesian coordinates when a measurement is to be taken. Alternatively, the supporting mechanism for the movable member 16 and the probe 14 can be a conventional Cartesian CMM, having three serially-arranged carriages which move in X, Y and Z directions respectively.

If desired, in any of the above arrangements, the probe 14 may be mounted to the movable member 16 via a probe head, which is rotatable in one or two axes to orientate the probe. Several suitable probe heads are available from the present applicants/assignees Renishaw plc. The probe head may be of the indexing type, such as the Renishaw PH10 model, which can be locked into any of a plurality of orientations. Or it may be a continuously rotatable probe head, such as the Renishaw PH20 model. Or the probe itself may have one or two axes of continuous rotation, such as the Renishaw REVO® or GYRO™ probes.

The invention is not restricted to use on an automated CMM as described. It may be used in any form of workpiece inspection which uses comparative measurement against a known artefact. For example, it is known to use a standard fixture gauge in conjunction with an artefact having known dimensions. The fixture gauge has one or more measurement transducers which are used to compare the artefact with a feature or features of a workpiece. These measurement transducers may take the form of contact probes such as LVDTs, or non-contact probes using optical beams and corresponding photodetectors. In accordance with the present invention, correction values for use with the fixture gauge may be determined at various different temperatures, and stored along with their corresponding temperature values. In use, the temperature of the workpiece or of the environment is measured, compared to the stored temperature values, and the corresponding set of correction values is selected and applied to the measurements made. Alternatively, as with the automated method described above, the required correction values may be determined by extrapolation or by interpolation between two or more stored sets of values.

The invention claimed is:

1. A method of measurement on measuring apparatus, comprising:
   providing a master artefact in the form of a reference workpiece which is one of a series of nominally identical workpieces to be measured, the master artefact having dimensions which are known from a source which is external to said measuring apparatus,
   measuring the master artefact on said apparatus at two or more temperatures, and producing two or more corresponding sets of measured dimensional values of the master artefact at the respective temperatures,
   measuring said temperatures at which the master artefact was measured,
   generating one or more error maps or look-up tables or functions which relate the measured dimensional values of the master artefact to the known dimensions of the master artefact, the or each error map, look-up table or function being dependent on said respective temperatures at which the master artefact was measured.

2. A method of measurement according to claim 1, wherein one error map or lookup table or function relates the measured dimensional values of the master artefact to the known dimensions of the master artefact at a plurality of the respective temperatures.

3. A method of measurement according to claim 1, wherein respective error maps or lookup tables or functions relate the measured dimensional values of the master artefact to the known dimensions of the master artefact at respective said temperatures.

4. A method of measurement according to claim 1, further comprising:
   measuring a production workpiece on said apparatus to obtain measured workpiece dimensional values, and measuring the temperature at which the workpiece dimensional values were obtained, and
   correcting the workpiece dimensional values with correction values derived from a said error map, look-up table or function,
   wherein the correction values are determined in dependence upon the temperature at which the workpiece dimensional values were obtained.

5. A method according to claim 1, wherein the measuring apparatus has not been calibrated to traceable standards.

6. A method according to claim 1, wherein the measuring apparatus has been calibrated to traceable standards.

7. A method according to claim 1, wherein the known master artefact dimensions are obtained by calibrating the master artefact.

8. A method according to claim 7, wherein the master artefact is calibrated on a separate measuring system which is certified as an absolute measuring system.

9. A method according to claim 1, wherein the known dimensions of the workpiece forming the master artefact are obtained from design data for the workpiece.

10. A method according to claim 1, wherein the measured dimensional values are coordinate measurements of individual points on the surface of the artefact or workpiece.

11. A method according to claim 1, wherein the measured dimensional values are measured dimensions of features of the artefact or workpiece.

12. A method according to claim 1, wherein the measured dimensional values are dimensional relationships between features of the artefact or workpiece.

13. A method according to claim 1, wherein the measuring apparatus is a coordinate measuring apparatus.

14. A method according to claim 13, wherein the coordinate measuring apparatus comprises a probe mounted for rotation about one or two axes.

15. A method according to claim 1, wherein the measuring apparatus comprises a contact probe.

16. A method according to claim 1, wherein the measuring apparatus comprises a non-contact probe.

17. A method of measurement on measuring apparatus, comprising:
prov255ing a master artefact in the form of a reference workpiece having dimensions which are known from a source which is external to said measuring apparatus,
measuring the reference workpiece on said apparatus at a first temperature, and producing a resulting first set of measured dimensional values of the reference workpiece at the first temperature,
generating at least one error map or look-up table or function which relates the measured dimensional values of the reference workpiece at the first temperature to the known dimensions of the reference workpiece,
measuring a production workpiece on said apparatus to obtain measured workpiece dimensional values, and measuring the temperature at which the workpiece dimensional values were obtained, and
correcting the workpiece dimensional values with correction values derived from the error map, look-up table or function,
wherein the correction values are determined in dependence upon the temperature at which the workpiece dimensional values were obtained.

18. A method according to claim 17, including checking whether the temperature at which a production workpiece is measured or is to be measured corresponds to the temperature of a said error map or lookup table or function, to within a predetermined tolerance, and if so then correcting the workpiece dimensional values with correction values derived from the corresponding error map or lookup table or function.

19. A method according to claim 17, including checking whether the temperature at which a production workpiece is measured or is to be measured corresponds to the temperature of a said error map or lookup table or function, to within a predetermined tolerance, and if not then remeasuring the master artefact and producing a further set of measured dimensional values of the master artefact at the respective temperature.

20. A method according to claim 17, wherein the production workpiece is one of a series of nominally identical workpieces.

21. A method of measurement according to claim 17, wherein the correction values are derived by extrapolation or interpolation from the one or more error maps, look-up tables or functions, in dependence upon the temperature at which the workpiece dimensional values were obtained.

22. A method according to claim 21, wherein the correction values are derived by interpolation using a function which is derived from two or more error maps or lookup tables.

23. A measuring apparatus comprising:
a measuring device configured (i) to measure a master artefact on the apparatus at a first temperature and (ii) to produce a resulting first set of measured dimensional values of the master artefact at the first temperature, the master artefact being in the form of a reference workpiece having dimensions which are known from a source which is external to the apparatus;
a temperature measuring device configured to measure the temperature at which the master artefact was measured; and
a computer control configured to generate one or more error maps or look-up tables or functions which relate the measured dimensional values of the master artefact at the first temperature to the known dimensions of the master artefact,
wherein the or each error map, look-up table or function is dependent on the temperature at which the master artefact was measured.

24. A non-transitory computer-readable medium storing a software program for a measuring apparatus, the program being configured to cause the apparatus to perform the following:
measuring a master artefact on said apparatus at a first temperature, and producing a resulting first set of measured dimensional values of the master artefact at the first temperature, wherein the master artefact is in the form of a reference workpiece having dimensions which are known from a source which is external to said measuring apparatus,
generating one or more error maps or look-up tables or functions which relate the measured dimensional values of the master artefact at the first temperature to the known dimensions of the master artefact, and
measuring the temperature at which the master artefact was measured, the or each error map, look-up table or function being dependent on said temperature at which the master artefact was measured.

25. A method of calibration on measuring apparatus, comprising:
measuring a master artefact on said apparatus at a first temperature, and producing a resulting first set of measured dimensional values of the master artefact at the first temperature, wherein the master artefact is in the form of a reference workpiece having dimensions which are known from a source which is external to said measuring apparatus,
generating one or more error maps or look-up tables or functions which relate the measured dimensional values of the master artefact at the first temperature to the known dimensions of the master artefact, and measuring the temperature at which the master artefact was measured, the or each error map, look-up table or function being dependent on said temperature at which the master artefact was measured.

* * * * *